United States Patent [19]

Bergh et al.

[11] Patent Number: 4,467,387

[45] Date of Patent: Aug. 21, 1984

[54] COMBINATION STRUT INSULATOR AND LIGHTNING ARRESTER

[75] Inventors: Daniel D. Bergh, Lenox; Robert E. Koch; John A. Timoshenko, both of Pittsfield, all of Mass.

[73] Assignee: General Electric Company, King of Prussia, Pa.

[21] Appl. No.: 429,711

[22] Filed: Sep. 30, 1982

[51] Int. Cl.[3] .......................... H02H 9/06; H01T 1/16; H01B 17/46

[52] U.S. Cl. .......................................... 361/132; 174/2; 174/139; 174/140 S; 174/178; 361/127; 361/137

[58] Field of Search ................. 174/2, 43, 139, 140 R, 174/140 H, 140 S, 140 CR, 141 R, 148, 178, 179; 361/117, 126, 127, 128, 129, 130, 132, 137, 138

[56] References Cited

U.S. PATENT DOCUMENTS

| | | | |
|---|---|---|---|
| 1,937,296 | 11/1933 | Sporn et al. | 174/141 R X |
| 2,587,587 | 3/1952 | Bellezza et al. | 174/140 R |
| 4,092,694 | 5/1978 | Stetson | 361/127 X |
| 4,270,160 | 5/1981 | Nagai | 361/132 |

FOREIGN PATENT DOCUMENTS

| | | | |
|---|---|---|---|
| 1638121 | 3/1971 | Fed. Rep. of Germany | 361/130 |

*Primary Examiner*—Laramie E. Askin

*Attorney, Agent, or Firm*—Robert A. Cahill; William Freedman

[57] ABSTRACT

An elongated, insulative tube of high mechanical strength is equipped with fittings at each end for electrical connection with a high voltage transmission line and a grounded tower. An external spark gap is provided between a first arcing ring mounted in electrical connection with one end fitting and a second arcing ring mounted to the tube intermediate its ends and electrically connected with a contact member disposed within the tube. The portion of the tube interior between the contact member and the other end fitting is packed with a series array of varistor discs. The tube maintains the line in spaced relation with the tower, while the varistor array and spark gap absorb voltage surge differentials between the line and tower.

10 Claims, 10 Drawing Figures

COMBINATION STRUT INSULATOR AND LIGHTNING ARRESTER

BACKGROUND OF THE INVENTION

The present invention relates generally to aerial high voltage transmission line equipment and particularly to apparatus for both supporting a transmission line from a superstructure or tower and suppressing any voltage surge differentials occurring between the transmission line and tower.

Aerial transmission lines spanning the countryside are subjected to numerous hazards. For example, they are subject to severe dynamic loading caused by varying weather conditions such as wide variations in temperature, high winds, snow, icing, line breakage, etc. Consequently, an extreme physical burden is imposed on the insulative devices supporting the transmission lines from the tower. In addition, the transmission lines must be protected from lightning strikes. To this end, current practice is to utilize overhead shield wires in conjunction with a tower footing resistance as low as possible. In those situations where shield wire protection is inadequate or where a low tower footing resistance cannot be achieved, the use of line-type surge arresters separate and distinct from the line insulation has been proposed.

It is accordingly an object of the present invention to provide an insulative transmission line supporting device and a transmission line lightning arrester in a single, integrated structure.

An additional object of the present invention is to provide an integrated structure of the above character, wherein the insulative supporting function is that of a so-called strut insulator.

A further object is to provide a combined insulative support and lightning arrester device for aerial high voltage transmission lines which is efficient in construction and reliable in service over a long useful life.

Other objects of the invention will in part be obvious and in part appear hereinafter.

SUMMARY OF THE INVENTION

In accordance with the present invention, there is provided a combination strut insulator and lightning arrester comprising an elongated, insulative tube of high mechanical strength and rigidity and having fittings securely affixed to each end for respective electrical and mechanical connection to a transmission line and a grounded transmission tower. To the transmission line end fitting, there is affixed a first arcing ring, while a second arcing ring is secured at an intermediate location to the tube body. These arcing rings are disposed in spaced relation to provide a spark gap. An electrical connection from the second arcing ring is brought in through the tube wall to a contact member supported in the tube interior. The portion of the tube interior between the contact member and the tower end fitting is packed with a series array of varistor discs, preferably zinc oxide varistors. The structural integrity necessary to support the transmission line under dynamic and static loadings is provided by the tube, while protection against lightning strikes to the line and the tower is provided by the series combination of the spark gap and varistor stack. Requisite dielectric strength and electrical creepage distance for high voltage applications, as well as weather resistance is provided by a plurality of weathersheds, preferably of elastomeric material, carried by the tube.

For a full understanding of the nature and objects of the present invention, reference should be had to the following detailed description taken in conjunction with the accompanying drawings, in which.

Corresponding reference numerals refer to like parts throughout the several views of the drawings.

DETAILED DESCRIPTION

Figure 1:
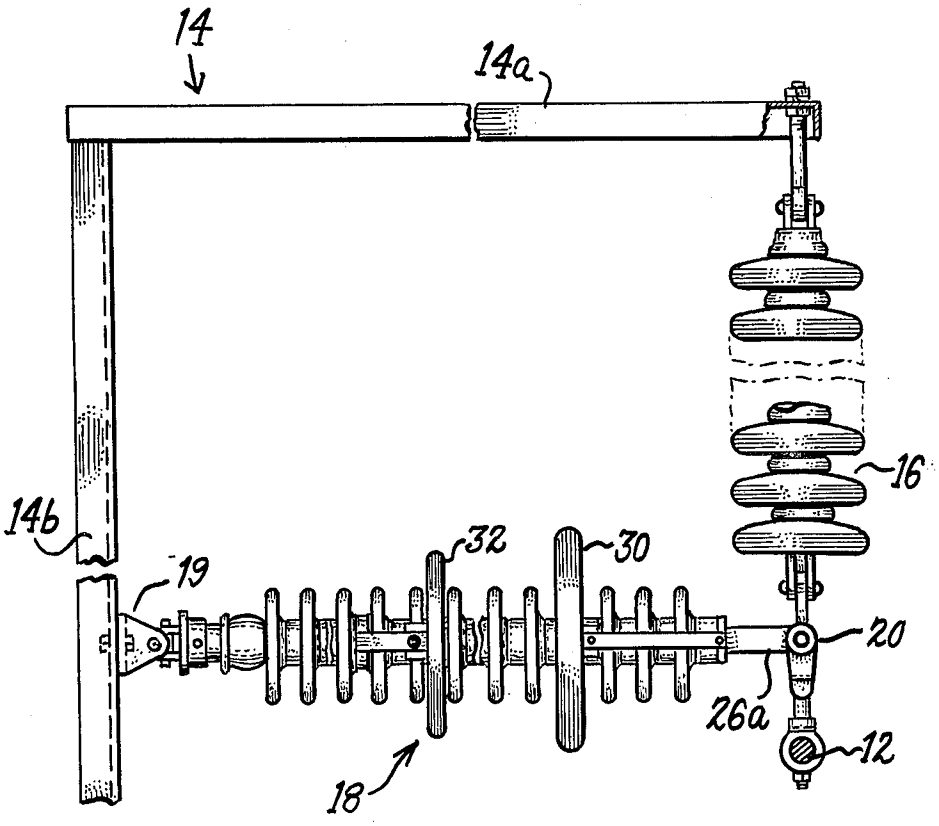
FIG. 1 is a fragmentary elevational view of the combination strut insulator and lightning arrester or "strut arrester" shown supporting a transmission line from a transmission tower.

Referring first to FIG. 1, there is shown a transmission line 12 supported from a superstructure or tower, generally indicated at 14, by a conventional suspension insulator string 16, depended from a tower crossarm 14*a*, and a combination strut insulator and lightning arrester or "strut arrester", generally indicated at 18 and constructed in accordance with the present invention. Strut arrester 18 is mechanically connected to a tower upright 14*b* via a conventional universal joint fitting 19. To insure electrical continuity between the strut arrester and the tower, if metal, or a ground cable through the universal joint, a conductive metal link (not shown) is installed. The other end of the strut arrester is connected with suspension insulator 16 and transmission line 12 by conventional hardware indicated at 20.

Figure 2:
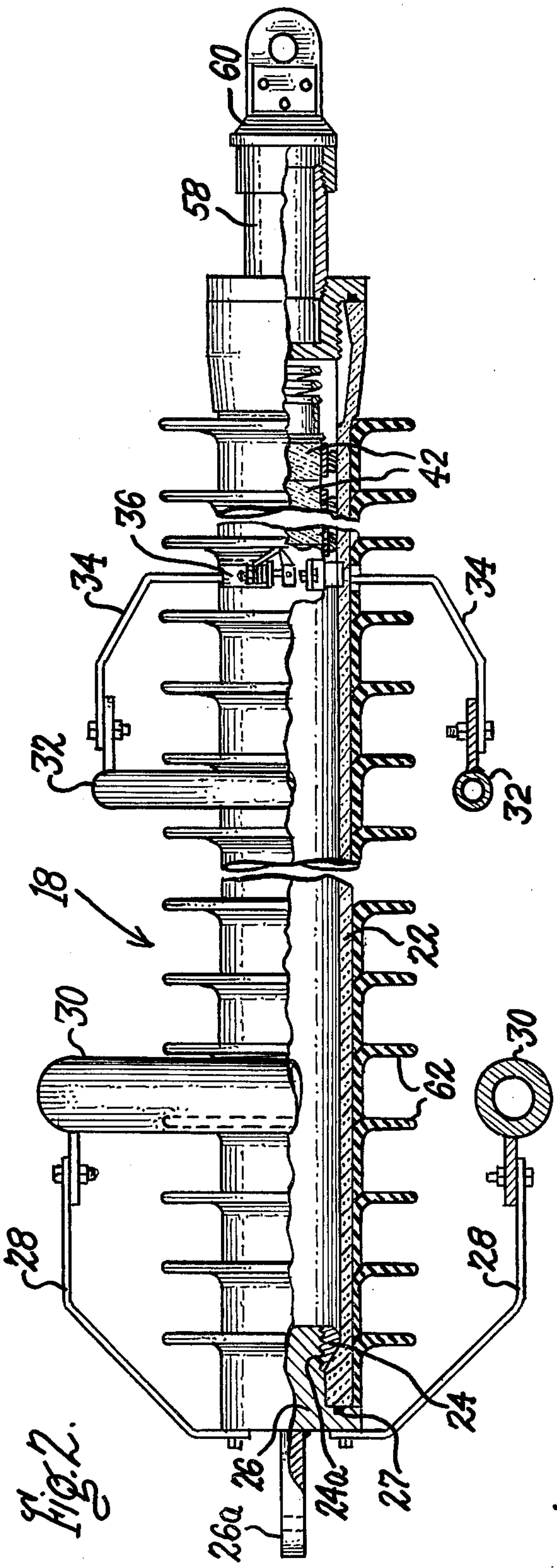
FIG. 2 is an enlarged side view, fragmented and partially broken away, of the strut arrester of FIG. 1.
Figure 6:
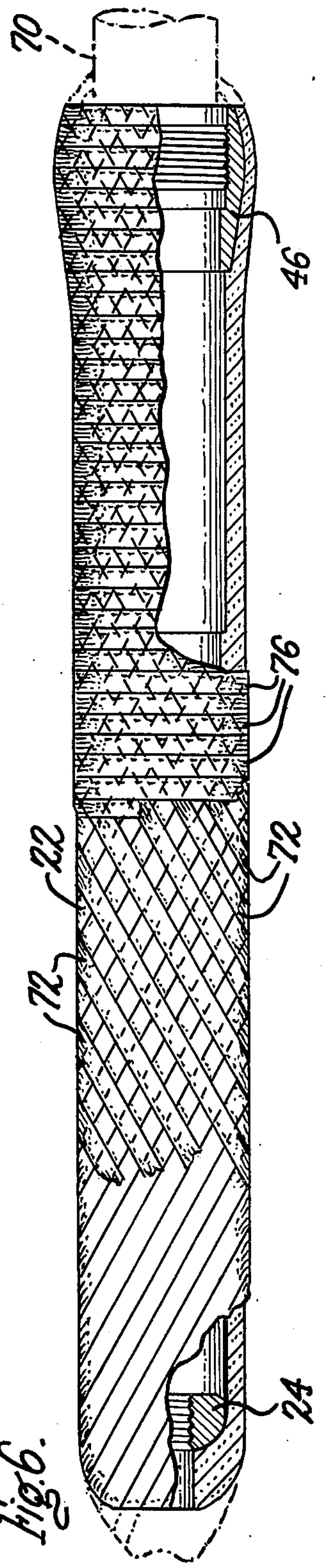
FIG. 6 is a longitudinal view, partially broken away, of the insulative tube utilized in the strut arrester of FIG. 1.
Figure 7:
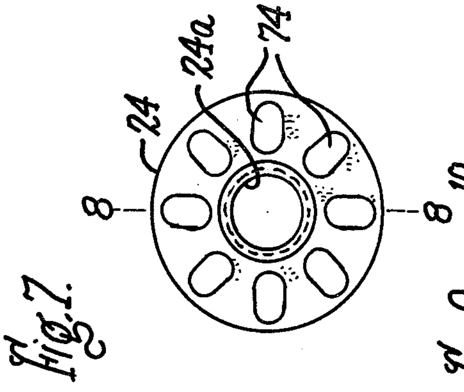
FIG. 7 is an end view of a metal insert affixed in one end of the tube of FIG. 6.
Figure 9:
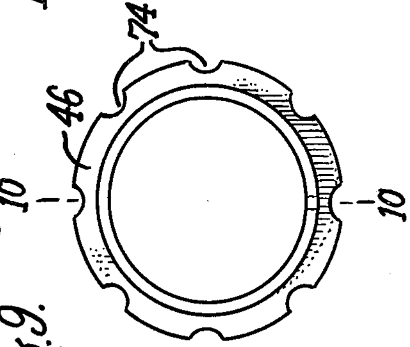
FIG. 9 is an end view of a metal insert affixed in the other end of the tube of FIG. 6.

Strut arrester 18, best seen in FIG. 2, includes an elongated, insulative tube 22 of high mechanical strength whose construction will be detailed in conjunction with FIG. 6. Affixed in the line end of the tube is a metal insert fitting 24, which is seen in FIGS. 6 and 7 to have a truncated conical shape with a central threaded bore 24*a*. Into this bore is threaded a metal end fitting 26 having an apertured tang 26*a* for pivotal connection to hardware 20, as seen in FIG. 1. An O-ring 27 provides an airtight seal between the insert and end fitting. Bolted to end fitting 26 are a pair of bracket arms 28 serving to mount an annular arcing ring 30 encompassing the strut arrester body at a location spaced inwardly of its line end.

Figure 4:
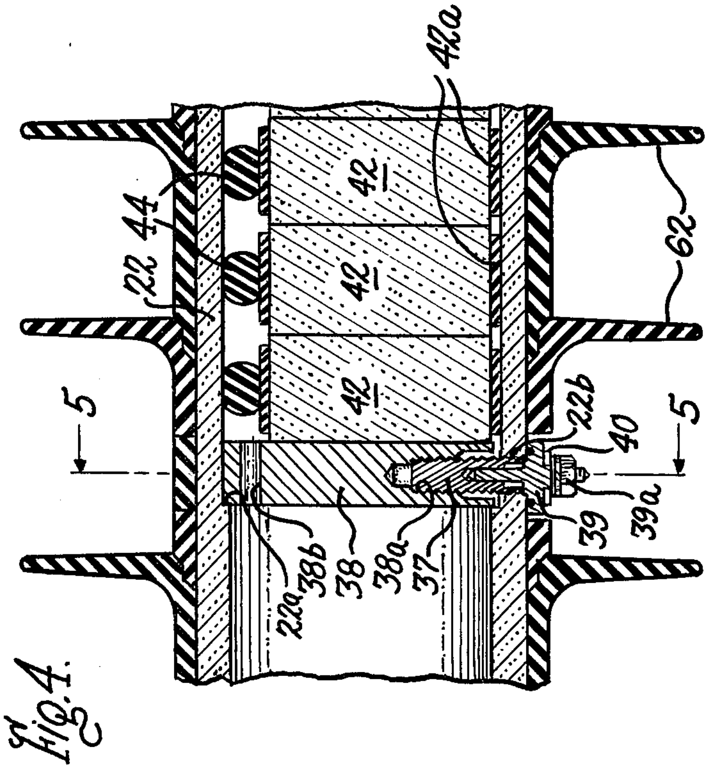
FIG. 4 is a fragmentary, longitudinal sectional view of an intermediate portion of the strut arrester of FIG. 1.
Figure 5:
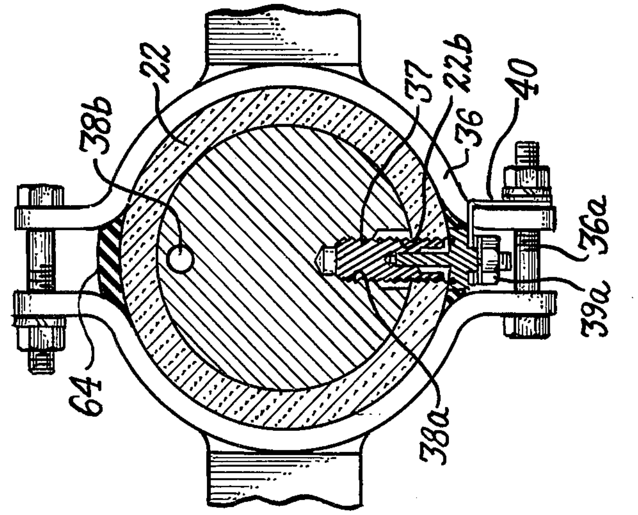
FIG. 5 is a sectional view taken along line 5—5 of FIG. 4, with the arcing ring mounting bracket added.

Referring jointly to FIGS. 2, 4 and 5, a second annular arcing ring 32 is mounted by bracket arms 34 which are carried by a clamp 36 secured in embracing relation with tube 22 at a location intermediate its ends. The two arcing rings are thus disposed in spaced relation to define an arc gap therebetween. As best seen in FIG. 4, a circular contact member 38, inserted into tube 22 from the tower end, is seated against an annular shoulder 22a created in the tube bore. A threaded, radially extending blind hole 38a in the contact member receives a threaded plug 37 introduced through a hole 22b in the tube sidewall. The plug, in turn, has a tapped axial bore to accept a threaded inner stem of an electrical terminal post 39. An outer threaded stem of this post accepts a nut 39a which clamps down on one end of a conductive strap 40. The other end of this strap is secured in electrical connection with clamp 36 and thus arcing ring 32 by one of the clamp securing bolts 36a, as seen in FIG. 5. Appropriate provisions are made to provide an airtight seal around hole 22b in the tube sidewall.

From the description thus far, it is seen that transmission line 12 and contact member 38 are included in a series circuit including the arcing rings and the spark gap created therebetween.

Figure 3:
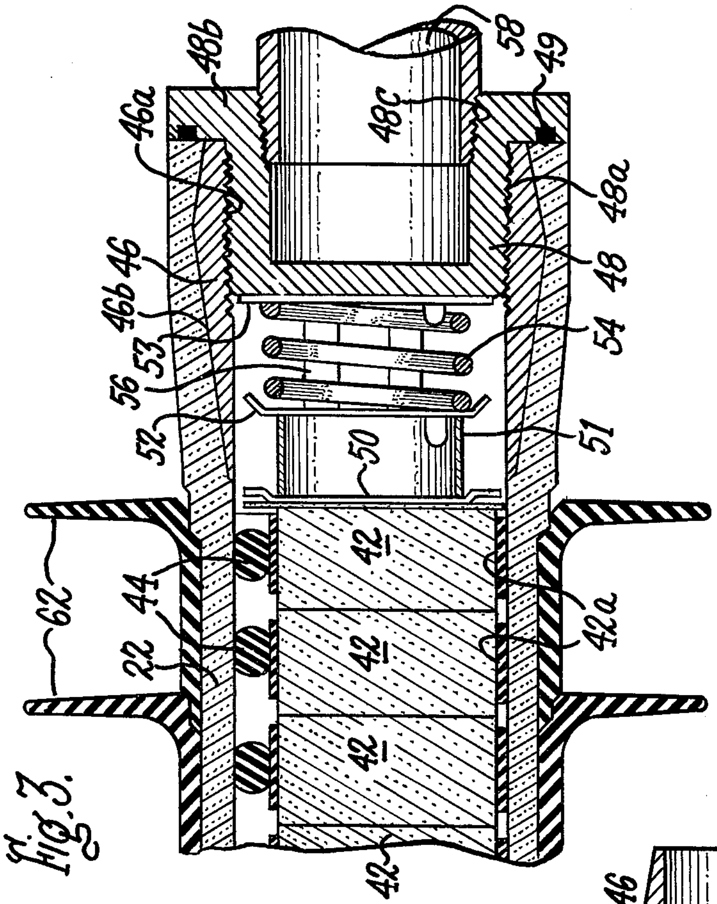
FIG. 3 is a fragmentary, longitudinal sectional view of the tower end portion of the strut arrester of FIG. 1.
Figure 8:
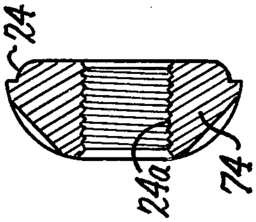
FIG. 8 is a sectional view taken along line 8—8 of FIG. 7.
Figure 10:
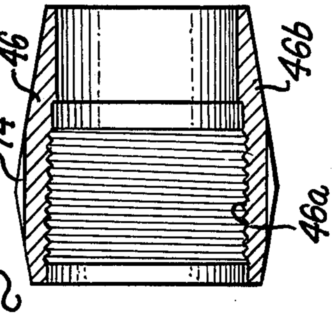
FIG. 10 is a sectional view taken along line 10—10 of FIG. 9.

From contact member 38 to just short of the tower end of strut arrester 18, the interior of tube 22 is packed with a series array of zinc oxide varistors 42, as seen in FIGS. 2, 3 and 4. These varistors are of known construction, having a sintered disc-shaped body and electrodes applied to their opposed faces. Thus, when stacked together as shown, the electrodes of adjacent varistors are in electrical contacting engagement, while the varistor electrode at the line end of the stack is in electrical contacting engagement with contact member 38. The varistor discs are collared with elastomeric sleeves 42a and are biased against the tube sidewall by discrete resilient balls 44 for mounting and heat sinking purposes as disclosed in commonly assigned U.S. Pat. No. 4,092,694.

Referring to FIG. 3, there is affixed in the tower end of tube 22 a metal insert 46 in the general shape of a sleeve having a threaded internal bore 46a and a crowned exterior surface 46b, as shown. A cupshaped end fitting 48 is provided with an external threaded portion 48a for engagement in the insert bore to the point where its annular shoulder 48b butts against the flush outer ends of the insert and tube. An O-ring 49, accommodated in an annular groove in the underside of shoulder 48b, provides an airtight seal between the insert and end fitting. Between end fitting 48 and the end of the varistor stack there is disposed a contact disc 50, a metal sleeve 51, and a pair of centering metallic discs 52 and 53 for an intermediate compression spring 54. This spring compresses the varistor stack to insure good inter-electrode electrical contacting engagement. A conductive foil strip 56, with its ends wrapped about the outermost spring convolutions insures good electrical conductivity between the varistor stack and end fitting 48. A suitable dessicant (not shown) is placed in the available space between the varistor stack and the end fitting, including the interior of sleeve 51, to insure a dry air environment in the tube interior. To this end, conductive member 38 is provided with a vent hole 38b, as seen in FIG. 4, so that air in the tube interior beyond the varistor stack can be dried.

Threaded into internal threads 48c in end fitting 48 is one end of a metal pipe 58 which, depending on the particular installation, may be several inches to several feet in length. To the other end of this pipe is threaded a conventional hardware fitting 60 appropriate for coupling with the tower-mounted universal joint 19 (FIG. 1).

To protect the strut arrester from the elements and to afford the necessary dielectric strength for high voltage application, a plurality of weathersheds 62 of elastomeric material are slipped onto the exterior of tube 22 in partially overlapped, end-to-end relation covering substantially the entire length of the tube. A circumferential section of one weathershed is cut away to afford clearance for arcing ring mounting clamp 36 to directly embrace the tube, as seen in FIG. 5. To fill the voids between clamp halves, and about terminal post 39, inserts 64 are utilized. Preferably, liberal amounts of silicone grease are applied to the junctions between weathersheds and about terminal post 39 for weather protection.

It is thus seen that the transmission line is connected to ground via the series circuit including the arcing ring spark gap and the varistor stack. At normal transmission line voltages, the spark gap is an open circuit isolating the transmission line from ground. However, when a lightning strike hits either the transmission line or the tower, the spark gap, which may be eighteen inches across, is breeched, and the lightning energy is absorbed by the varistor stack. The illustrated different sizes of the two arcing rings is resorted to in order to reasonably proportion the arcover voltage for lightning strikes to either the tower or the transmission line and of either polarity. It will be appreciated that the installation of the strut arrester may be reversed end for end from that illustrated.

In addition to the above-described lightning arrester function of strut arrester 18, there is also the line supporting function which must contend with wide variations in dynamic and static loading. The brunt of this mechanical loading is borne by tube 22 and the inserts 24 and 46 incorporated in the tube ends. Thus, not only the tube itself but its grip on these inserts must withstand tremendous compressive tensile and, to a lesser extent, torsional and bending stresses. While elongated elements heretofore utilized in line insulator applications are known to have the requisite mechanical strength, the affixation of the end fittings thereto, typically by crimping or gluing, has been their weak point.

Tube 22, as disclosed herein, is constructed in a manner such as to provide not only high body strength and resistance to deformation but also to achieve a tenacious grip on the fittings at each end, specifically inserts 24 and 46. To this end, tube 22 is formed of glass fibers and a suitable fiber bonding resin; the fibers being drawn through a liquid resin bath and wound as a band of plural, continuous strands onto a rotating mandrel indicated in phantom at 70 in FIG. 6. The peripheral surface of the mandrel conforms to the final interior tube surface shown and includes suitable means for establishing the longitudinal positions of inserts 24 and 46. The glass fiber band is wound in alternating, oppositely directed helical convolutions 72 to develop a continuous tubular layer after multiple oppositely directed traverses of the winding equipment. The helix angle may range from 10° to 50°. As an important feature, the glass fibers are wound onto the mandrel outboard of the inserts 24, 46, as illustrated in phantom. In addition, the exterior surfaces of the inserts are notched, as indicated at 74, such that some of the helical convolutions become lodged therein. This constributes to the exceptional torsional strength of the tube-insert joint.

After at least two and up to six or more helical wound tubular layers have been developed, the winding pattern is changed to a circumferential wind, and a continuous tubular layer of virtually circumferential convolutions 76 (helix angle of 85° or more) are wound atop the previously developed multiple helically wound tubular layers. Consecutive convolutions 76 are wound in band abutting or, preferably, slightly overlapping relation.

These circumferential convolutions are likewise wound beyond the ends of the inserts. After developing at least one continuous tubular layer of circumferential convolutions 76, the winding pattern is switched back to the helical wind, and multiple helically wound tubular layers are applied. This alternation between helical and circumferential winding patterns is continued until the tube is built up to the desired wall thickness. The final tubular layer is applied as a circumferential wind, at which time the indicated extra thickness of the tube end beyond insert 24 is developed. Preferably the initial tubular layer is also applied as a circumferential wind. The fully wound tube is subject to a curing cycle to harden the resin bonding agent and the mandrel is removed. The portions of the tube ends illustrated in phantom are then cut off. After suitable machining to finish off the tube exterior, the tube is ready for assembly into the strut arrester.

It will be noted that, by virtue of the above-described construction of tube 22, the inserts are held securely captured in the tube ends in interference fit fashion. The essentially conical shape of insert 24, together with the extra tube material embracing the insert and beyond, provides a structure capable of withstanding tremendous tensile forces attempting to pull the insert from the tube. The greater length and crowned exterior surface of insert 46 achieve the same results at the other end of the tube. Since the end fittings threaded into the inserts abut the ends of the tube, the tube itself effectively withstands the compressive forces on the strut arrester 18. While tube 22 is disclosed herein in its application to strut arrester 18, it will be appreciated that it can be utilized in other applications where high mechanical strength and long term resistance to deformation is desired.

It is thus seen that the objects set forth above, including those made apparent from the preceding description, are efficiently attained and, since certain changes may be made in the above description without departing from the scope of the invention, it is intended that all matter contained in the above description or shown in the accompanying drawings shall be interpreted as illustrative and not in a limiting sense.

Having described the invention, what is claimed as new and desired to secure by Letters Patent is:

1. An integrated structure for insulatively supporting an aerial high voltage transmission line from a grounded tower and for absorbing the energy associated with lightning strikes to the transmission line and tower, said integrated structure comprising, in combination:

A. an elongated, insulative tube of high mechanical strength;

B. metallic fittings affixed to the ends of said tube for accommodating physical connection with the transmission line and tower;

C. a first arcing ring mounted in embracing relation with said tube and electrically connected with said fitting at one end of said tube;

D. a second arcing ring externally mounted to said tube at a location intermediate its ends, said first and second arcing rings being disposed in spaced relation to provide an arc gap therebetween;

E. a contact member supported within said tube and electrically connected with said second arcing ring;

F. a series array of varistor elements disposed within said tube in electrical connection between said contact member and said fitting at the other end of said tube;

G. a plurality of weather sheds covering the exterior surface of said tube over a substantial portion of its length;

H. whereby in use the integrated structure will insulatively support the transmission line in spaced relation from the tower by said tube and said varistor array will function to absorb any lightning induced voltage surges of sufficient magnitude to break down said arc gap.

2. The integrated structure defined in claim 1, wherein said first arcing ring is disposed adjacent the end of said tube which is to be disposed nearest the transmission line.

3. The integrated structure defined in claim 1, wherein said contact member is seated against a shoulder formed in the interior surface of said tube, said integrated structure further including a compression spring disposed between said fitting at said tube other end and said varistor array, said spring biasing said varistor array against said contact member.

4. The integrated structure defined in claim 3, wherein a terminal post is threadedly engaged with said contact member and protrudes through an opening in the wall of said tube, and a conductive strap is electrically connected between said terminal post and a metallic mounting bracket for said second arcing ring.

5. The integrated structure defined in claim 1, wherein said fittings include metallic inserts captivated within the open ends of said tube.

6. The integrated structure defined in claim 5, wherein said inserts include central tapped bores for receiving threaded end fittings for accommodating mechanical and electrical connections with the transmission line and tower.

7. The integrated structure defined in claim 6 wherein said first arcing ring is mounted by said end fitting which is to be disposed nearest the transmission line.

8. The integrated structure defined in claim 7, wherein said end fittings include sealing means for providing airtight seals at said ends of said tube.

9. The integrated structure defined in claim 8, wherein said end fitting at the end of said tube which is to be disposed adjacent the tower includes a tapped bore for threadedly receiving one end of a metallic pipe of a selected length for providing the desired spacing of the transmission line from the tower.

10. The integrated structure defined in claim 1, wherein said first and second arcing rings are dimensioned such as to equalize the breakdown voltage of said arc gap for lightning strikes to either the transmission line or the tower and of either positive or negative polarity.

* * * * *